(12) United States Patent
Debrunner et al.

(10) Patent No.: US 8,942,062 B2
(45) Date of Patent: Jan. 27, 2015

(54) DETECTING STRUCTURAL CHANGES TO UNDERWATER STRUCTURES

(75) Inventors: Christian H. Debrunner, Conifer, CO (US); Alan K. Fettinger, Highlands Ranch, CO (US); Christopher L. Baker, Allison Park, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 583 days.

(21) Appl. No.: 13/280,914

(22) Filed: Oct. 25, 2011

(65) Prior Publication Data

US 2012/0099395 A1    Apr. 26, 2012

Related U.S. Application Data

(60) Provisional application No. 61/406,435, filed on Oct. 25, 2010.

(51) Int. Cl.
| | | |
|---|---|---|
| G01S 15/00 | (2006.01) | |
| G01S 15/89 | (2006.01) | |
| G06T 7/20 | (2006.01) | |
| G01S 15/02 | (2006.01) | |
| G01S 7/539 | (2006.01) | |
| G01S 15/66 | (2006.01) | |

(52) U.S. Cl.
CPC ............ G01S 15/89 (2013.01); G06T 7/2046 (2013.01); G01S 15/025 (2013.01); G01S 7/539 (2013.01); G01S 15/66 (2013.01); G06T 2200/04 (2013.01); G06T 2207/10028 (2013.01); G06T 2207/30181 (2013.01)
USPC ............................................ 367/21; 367/173

(58) Field of Classification Search
USPC .................................................... 367/21, 173
See application file for complete search history.

(56) References Cited

U.S. PATENT DOCUMENTS

| | | | | |
|---|---|---|---|---|
| 5,200,931 | A  * | 4/1993 | Kosalos et al. | 367/88 |
| 6,449,215 | B1 * | 9/2002 | Shell | 367/7 |
| 6,707,761 | B2 * | 3/2004 | Erikson | 367/131 |
| 7,184,926 | B2 | 2/2007 | Jarrott | |
| 2002/0071345 | A1* | 6/2002 | Chiang et al. | 367/138 |
| 2003/0058738 | A1 * | 3/2003 | Erikson | 367/7 |
| 2003/0167998 | A1* | 9/2003 | Huntsman | 114/312 |

(Continued)

OTHER PUBLICATIONS

Int'l Preliminary Report on Patentability—PCT/US2011/057690.*

(Continued)

*Primary Examiner* — Isam Alsomiri
*Assistant Examiner* — James Hulka
(74) *Attorney, Agent, or Firm* — Hamre, Schumann, Mueller & Larson, P.C.

(57) ABSTRACT

A method and system that can be used for scanning underwater structures. The method and system allow a user to gain a better understanding of an underwater structure. For example, the method and system detect change(s) to an underwater structure. An acoustic sonar wave is directed toward an underwater structure, and a reflected acoustic sonar wave is received and processed to produce a three dimensional image. Data points of this three-dimensional image of the underwater structure are aligned to a pre-existing three dimensional model of the underwater structure. A change detection model is generated based on the aligned 3D images, and the change detection model is compared to the pre-existing three dimensional model of the underwater structure. Based on the comparison, occurrences of structural changes in the underwater structure are detected.

13 Claims, 6 Drawing Sheets

(56) References Cited

U.S. PATENT DOCUMENTS

| | | | |
|---|---|---|---|
| 2006/0235583 A1* | 10/2006 | Larsen | 701/21 |
| 2007/0025185 A1* | 2/2007 | Green et al. | 367/124 |
| 2007/0106462 A1 | 5/2007 | Blain et al. | |
| 2007/0159922 A1 | 7/2007 | Zimmerman et al. | |
| 2008/0264323 A1* | 10/2008 | Gosling | 114/330 |
| 2009/0031940 A1 | 2/2009 | Stone et al. | |
| 2009/0323121 A1 | 12/2009 | Valkenburg et al. | |
| 2010/0020927 A1* | 1/2010 | Gilevich et al. | 378/57 |
| 2010/0046327 A1 | 2/2010 | Orlin et al. | |
| 2012/0099398 A1 | 4/2012 | Lichter et al. | |
| 2012/0099399 A1 | 4/2012 | Lichter et al. | |
| 2012/0099400 A1 | 4/2012 | Debrunner et al. | |
| 2012/0099402 A1 | 4/2012 | Debrunner et al. | |
| 2012/0101715 A1 | 4/2012 | Tangirala et al. | |

OTHER PUBLICATIONS

International Search Report for international application No. PCT/US2011/057690, dated Jan. 30, 2012 (5 pages).

Written Opinion of the International Searching Authority for international application No. PCT/US2011/057690, dated Jan. 30, 2012 (5 pages).

E. Coiras et al., "Rigid data association for shallow water surveys," IET Radar Sonar Navig., vol. 1, No. 5, 2007 (p. 354-361).

Supplementary European Search Report for European application No. 11838531.9, dated Oct. 31, 2014 (10 pages).

N. Fairfield et al., "Real-Time SLAM with Octree Evidence Grids for Exploration in Underwater Tunnels," Journal of Field Robotics, vol. 24, No. 1-2 (2007) p. 3-21.

K. Wurm et al., "OctoMap: A Probabilistic, Flexible, and Compact 3D Map Representation for Robotic Systems," Proc. of the ICRA 2010 Workshop on Best Practice in 3D Perception and Modeling for Mobile Manipulation, (2010) 8 pages.

M.L. Gendron and M.C. Lohrenz (U.S. Naval Res. Lab., Stennis Space Center), "The Automated Change Detection and Classification Real-time (ACDC-RT) System", Proceedings of IEEE Oceans 2007 Europe, Aberdeen. Jun. 18-21, 2007, pp. 1-4.†

Scott Reed, Jon Wood, Jose Vazquez, Pierre-Yves Mignotte, Benjamin Privat, "A smart ROV Solution for Ship Hull and Harbor Inspection", SPIE Defense, Security and Sensing Conference, Orlando, Florida, USA, Apr. 5-9, 2010.†

* cited by examiner

US 8,942,062 B2

DETECTING STRUCTURAL CHANGES TO UNDERWATER STRUCTURES

This application claims the benefit of priority of U.S. Provisional Application No. 61/406,435, filed on Oct. 25, 2010, and entitled DETECTING STRUCTURAL CHANGES TO UNDERWATER STRUCTURES, and which is herewith incorporated by reference in its entirety.

FIELD

This disclosure relates to the collection of sonar data from scanning underwater structures to obtain information about whether a structural change to an underwater structure has occurred.

BACKGROUND

There are a number of underwater structures and other equipment for which one might need to gain a better understanding. This better understanding can be useful for example to obtain information of an underwater structure and detect structural changes to the underwater structure. Current methods of inspecting underwater structures include inspections using divers, remotely operated vehicles (ROVs) and autonomous underwater vehicles (AUVs).

SUMMARY

A method and system is described that can be used for scanning underwater structures, to gain a better understanding of underwater structures, such as for example, for the purpose detecting structural changes in underwater structures and for directing inspection, repair, and manipulation of the underwater structure.

The method and system herein can be used to scan any type of underwater structure. For example, underwater structures include man-made objects, such as offshore oil platform support structures and piers and oil-well related equipment, as well as natural objects such as underwater mountain ranges, and can include structures that are wholly or partially underwater. Underwater structure can also include both stationary and non-stationary structures, for example that may experience drift in the underwater environment. More generally, underwater structure is meant as any arbitrary three dimensional structure with depth variation and that may have varying complexity.

As used herein, the term underwater includes any type of underwater environment in which an underwater structure may be located and may need to be scanned using the system described herein, including, but not limited to, salt-water locations such as seas and oceans, and freshwater locations.

In one embodiment, a method of detecting structural changes to underwater structures includes directing an acoustic sonar wave toward an underwater structure, and receiving a response from directing the acoustic sonar wave toward the underwater structure. The acoustic sonar is configured as a three dimensional image based sonar, where a pulse at a certain frequency provides data for a receiver to generate a three dimensional image. That is, data points are obtained from the response, and the data points are configured to provide a three-dimensional image of the underwater structure. The data points obtained are aligned to the pre-existing three dimensional model of the underwater structure. A change detection model is generated based on the aligned sample. The change detection model is compared to the pre-existing three dimensional model of the underwater structure. Based on the comparison, the occurrence of structural changes in the underwater structure is detected.

In one embodiment, it is desirable to have a sonar sensor system, which can carry out the detection methods onboard an underwater vehicle. The underwater vehicle is, for example, one of an autonomous underwater vehicle (AUV). As used herein, an AUV is an autonomous underwater vehicle that is unmanned and is not tethered to a host vessel. However, it will be appreciated that the underwater vehicle is not limited to AUVs, as the sonar system described herein could be implemented on other underwater vehicles, such as but not limited to remotely operated underwater vehicles (ROV).

With reference to the sonar system, in one embodiment, such a system for detecting structural changes to underwater structures includes a sensor onboard an underwater vehicle. The sensor is configured to direct an acoustic sonar wave toward an underwater structure. The reflected acoustic sonar wave is processed into a three dimensional image. A data storage is present onboard the underwater vehicle that is configured to receive a response from the sensor.

A data processor is also present onboard the underwater vehicle. The data processor is configured to obtain sensor data points from the data storage, where the data points are configured to provide a three-dimensional image of the underwater structure. The processor is configured to align a sample of the data points obtained to the pre-existing three dimensional model of the underwater structure, to generate a change detection model based on the aligned sample, and to compare the change detection model to the pre-existing three dimensional model of the underwater structure. Based on the comparison, the processor is configured to detect whether a structural change in the underwater structure has occurred.

DRAWINGS

DETAILED DESCRIPTION

Figure 1:
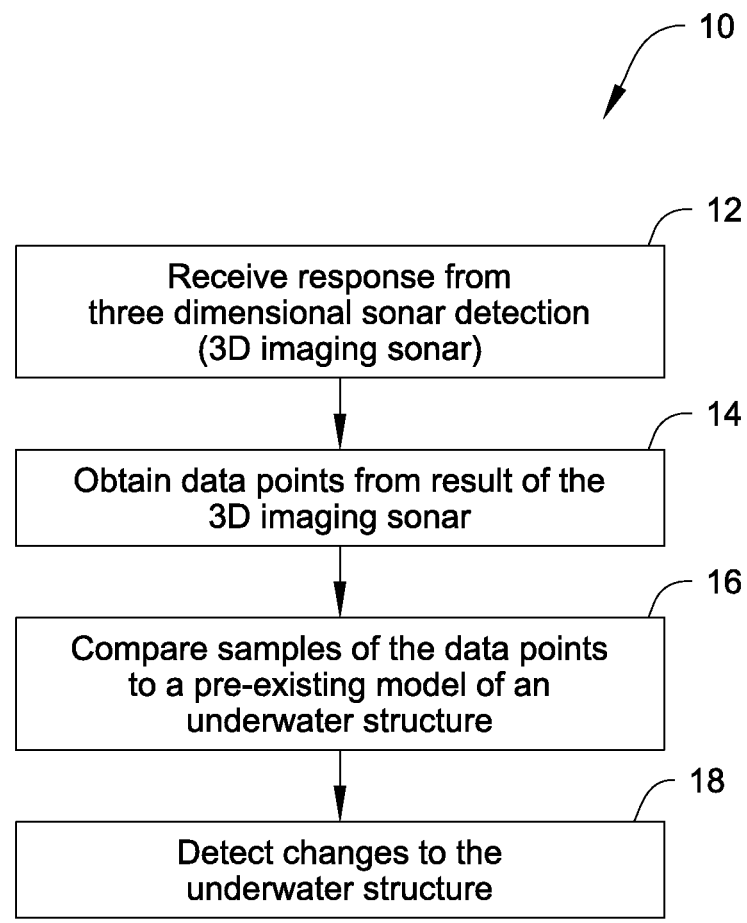
FIG. 1 shows a flow diagram of one embodiment of a method for detecting structural changes to underwater structures.

FIG. 1 shows a flow diagram of one embodiment of a method 10 for detecting structural changes in underwater structures. In general, the method is carried out by using an underwater vehicle's inertial navigation capability along with a feature based sensor, e.g. sonar imaging sensor, and a processor that compares the data retrieved by the sensor against a pre-existing three dimensional model of the underwater structure. In many circumstances, this can be performed onboard an underwater vehicle and in real time, often at about one second and sometimes less. For example, the process of sending out a 3D sonar ping, receiving data from it, filtering the data, and aligning it to the prior model may be completed in about one second or less.

The method 10 includes directing an acoustic sonar wave 5 toward an underwater structure. After directing the acoustic sonar wave, a response is received 12 from directing the acoustic sonar wave toward the underwater structure. For example, at 12, a sonar wave is reflected from the structure and received. It will be appreciated that the received acoustic sonar wave is processed by the sonar into a three dimensional image, i.e. the sonar is a three dimensional (3D) imaging sonar. The 3D imaging sonar can be any 3D sonar that creates a 3D image from the reflected sonar signal of a single transmitted sonar pulse or ping. An example of a suitable 3D sonar is the CodaOctopus Echoscope available from CodaOctopus Products. It will be appreciated that the 3D sonar can be adjusted and arranged such that it points toward an underwater structure, so that it can send a ping(s) at the underwater structure and can be oriented at a various desired angles relative to vertical and distances from the underwater structure.

It will be appreciated that inertial navigation systems are known, and are used to determine the position, orientation, and velocity (e.g. direction and speed of movement) of the underwater vehicle. An inertial navigation system can include a Doppler velocity log (DVL) unit that faces downward for use in determining velocity, but it will be appreciated that an inertial navigation system can be any system that can determine position, orientation, and velocity (e.g. direction and speed of movement). An example of a suitable inertial navigation system is the SEA DeVil available from Kearfott Corporation.

Once the response is received by the three dimensional sonar, data points are obtained 14 which are configured to provide a three-dimensional image of the underwater structure. The data points are then compared 16 to a pre-existing three dimensional model of the underwater structure. With reference to the comparison step 16, in one embodiment the response from the 3D sonar is aligned with the pre-existing three dimensional image of the underwater structure through an iterative process of fitting the data with the pre-existing three dimensional model. In some embodiments, this iterative process is based on data a single 3D sonar ping, but it will be appreciated that multiple 3D sonar pings may be used. Based on the comparison, structural changes to the underwater structure can be detected 18.

With reference to the pre-existing three dimensional model, it is assumed that a pre-existing three dimensional model is available for comparison to the data retrieved by the 3D sonar and for performing the change detection procedure. It will be appreciated that the source of the pre-existing three dimensional model can vary. In one example, the pre-existing three dimensional model is present at the time of initiating the investigation of structural changes, such as for example from an electronic file available from computer aided design software. This may be the case, for example, when a first reference model of the underwater structure is used to carry out later comparisons of the model structure. In other examples, the pre-existing three dimensional model is available after generating a three-dimensional image of the underwater structure or updating the position and orientation (pose), such as by a first iteration of the steps 12, 14, and 16. Subsequent iterations that further update the position, orientation, and model structure by matching to the model of the first iteration or other earlier iteration can be used as the pre-existing three dimensional model for subsequently received sonar data.

That is, in some cases, at initial startup the first reference may be from an electronic file already available, and once the 3D sonar has retrieved data, subsequent updates on the position and orientation can be used for further comparisons.

Figure 2:
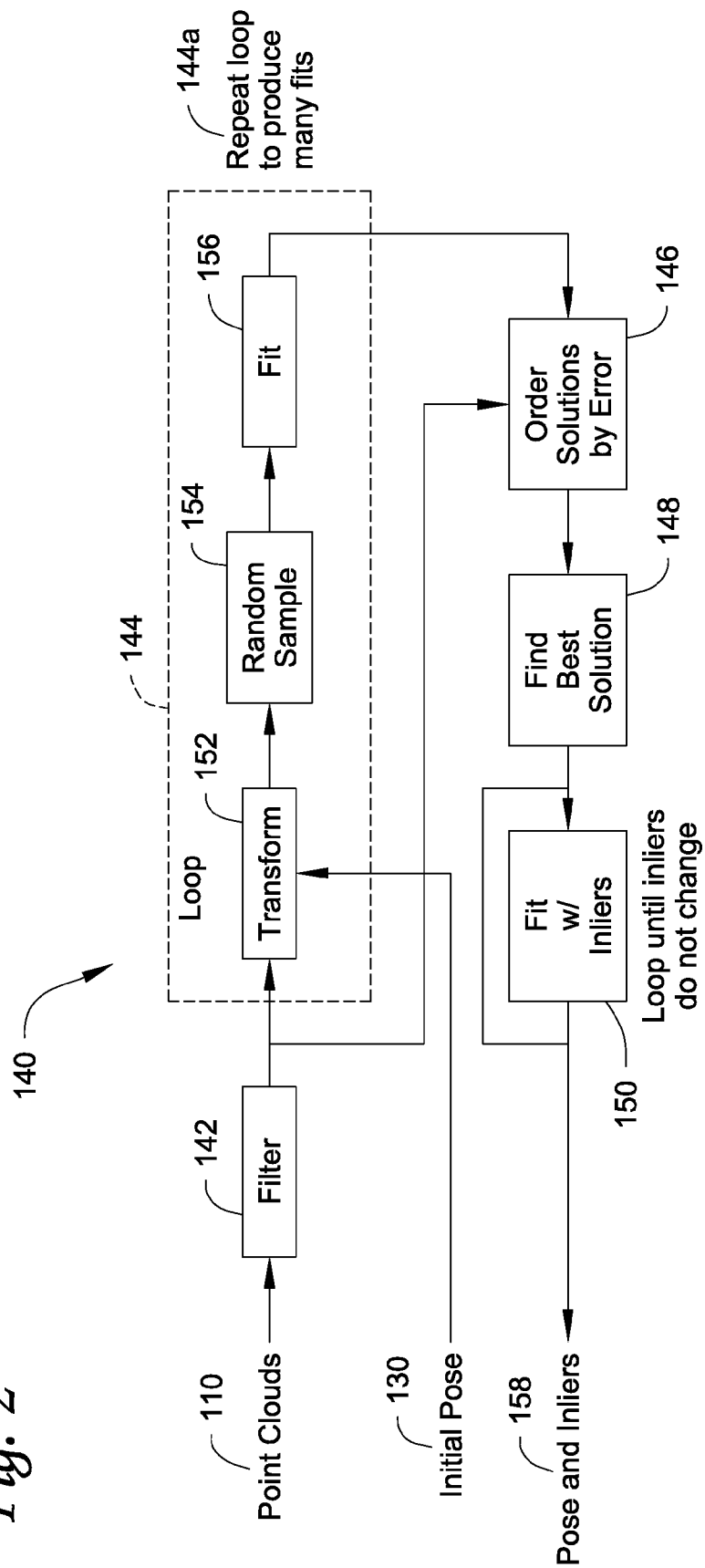
FIG. 2 shows a flow diagram of one embodiment of comparing information from a sonar response to a pre-existing model of an underwater structure, which may be employed in the method shown in FIG. 1.

With further reference to the comparing step 16, FIG. 2 shows a flow diagram of one embodiment of comparing information from a sonar response to a pre-existing model of an underwater structure. In the embodiment shown, the step of comparing the data points includes aligning a sample of the data points to the pre-existing three dimensional model of the underwater structure. As shown, the step of aligning includes an iterative method of repeatedly performing a fit processing based on multiple samples of the data points, which is further described below, and where the fit processing includes adjusting the data points sampled to match with the pre-existing three dimensional model of the underwater structure.

With reference to the details of FIG. 2, the response from the 3D sonar provides point clouds 110 that are used to perform the alignment process. The point clouds include data points which represent a 3D image of the underwater structure. Due to a usual high level of noise and potential non-useful information that is known to occur in 3D sonar point clouds, the data points in some circumstances are filtered 142 before undergoing alignment.

Figure 3:
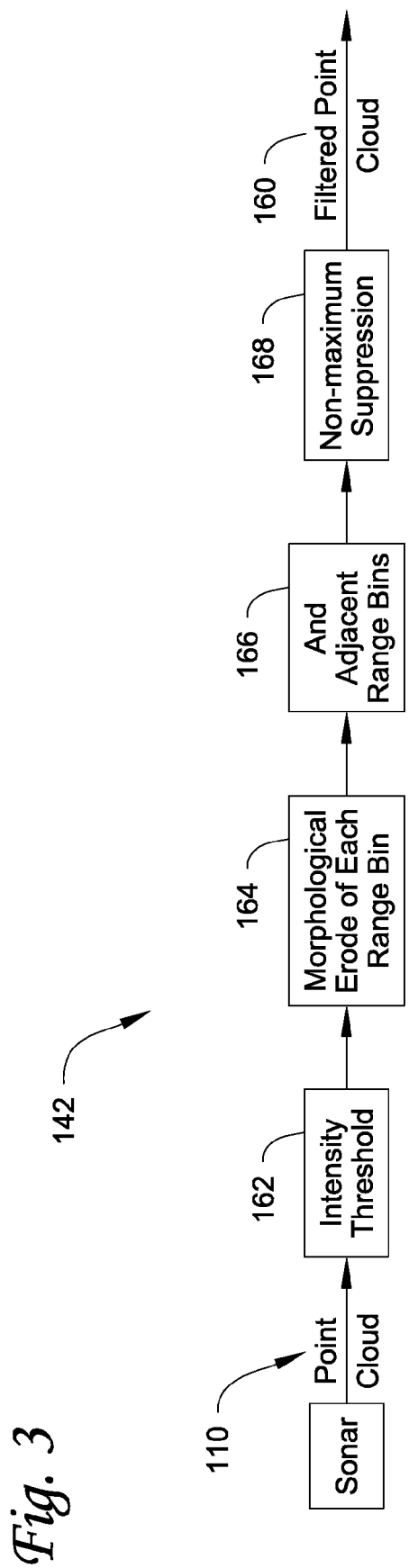
FIG. 3 shows a flow diagram of a filtering process of information obtained from a sonar response, which may be employed in the method shown in FIG. 1.

FIG. 3 shows a flow diagram of one embodiment of the filtering process 142, which may be included as part of the step of obtaining the data points 14 shown in FIG. 1. Filtering process 142 includes filtering the response received from directing the acoustic sonar wave toward the underwater structure, so as to obtain data points useful during alignment. The data from the sonar point cloud 110 is input through a series of data processing and filtering steps, which result in a filtered point cloud 160. In the embodiment shown, the point cloud 110 is input to an Intensity Threshold filter 162. Generally, the filtering process 142 performs morphological operations on the point cloud 110. For example, a Morphological Erode of Each Range Bin 164 is performed, and then Adjacent Range Bins 166 are combined. Box 164 and 166 represent non-limiting examples of certain morphological operations used by the filtering process 142. Next, a Non-maximum Suppression 168 step is performed before the filtered point cloud 160 is obtained. In box 168, the filter process 142 may perform a beam width reduction/compensation processing.

With further reference to FIG. 2, the filtered point cloud 160 proceeds to a processing loop 144. In one embodiment, the processing loop 144 is a RANSAC loop, i.e. random sample consensus, which is an iterative method to estimate parameters of a mathematical model from a set of observed data which contains "outliers". For example, the loop 144 represents a non-deterministic algorithm in the sense that it produces a reasonable result with a certain probability, and where the probability can increase as more iterations are performed. In this case, the parameters of the mathematical model are the position and orientation (pose) of the 3D sonar sensor relative to the pre-existing model of the underwater structure, and the observed data are the 3D points from the sonar. A basic assumption is that the observed data consists of "inliers", i.e., data that can be explained by the mathematical model with some pose parameters, and "outliers" which are data that cannot be thus explained. As a pre-existing three dimensional model is available in the method herein, such an iterative process, given a small set of inliers can be used to estimate the parameters of a pose by computing a pose that fits the data (i.e. 3D sonar data points) optimally to their corresponding closest model points.

As shown in FIG. 2, the loop 144 is a RANSAC loop that includes processing functions Transform 152, Random Sample 154, and Fit 156. In the Transform 152 portion, the point clouds undergo transformation to a coordinate system specified by the initial pose 130 that brings them into approximate alignment with the pre-existing three dimensional model.

As further shown in FIG. 2, an initial pose 130 is input into the Transform 152 portion. In some instances, the initial pose 130 represents the position and orientation from an underwater vehicle's inertial navigation system. In subsequent iterations, the initial pose can be the result from updated knowledge of the first or any preceding alignment that has occurred, while undergoing the procedure shown by FIG. 2. It will be appreciated that a preceding alignment can be appropriately adjusted based on other measurements, such as inertial velocity or acceleration and other inputs from the underwater vehicle's inertial navigation system.

With reference to the available pre-existing 3D model, the pre-existing 3D model is input to the diagram at 146, 156 and 150, and further described as follows.

In the Random Sample 154 portion of the loop 144, a sample of the points from the point cloud is obtained for further processing and comparison with the pre-existing three dimensional model. The Fit 156 portion of the loop 144 is where the points sampled from Random Sample 154 are adjusted to line up with the pre-existing three dimensional model. That is, the collective position (pose) of the 3D sonar data, e.g. data points, is rigidly adjusted to align the points with the pre-existing three dimensional model. In the Fit 156 portion, the data points can undergo one or more closest point calculations to determine the closest point on the model. The data points and the closest point on the model for each data point are used to compute the correction to the initial pose 130 that optimally aligns the data points and closest points on the model for each data point.

As described, the alignment process is an iterative method to determine a correction to the initial pose 130 that aligns as many points of the 3D sonar data as possible (the inliers) with the pre-existing three dimensional model. In some embodiments, this is achieved from a single ping or detection from the 3D sonar, for example data points from a single acoustic sonar pulse, from which the data point samples are taken. It will also be appreciated that multiple pings of 3D sonar may be employed as needed.

Thus, it will be appreciated that the functions Transform 152, Random Sample 154, and Fit 156 are configured as a loop 144 that can be repeated 144a as necessary to raise the confidence that the best alignment of the 3D sonar data with the pre-existing three dimensional model found in these iterations is truly the best possible alignment. The step of aligning in many embodiments includes repeatedly performing a fit processing based on multiple samples of the data points or data points from multiple acoustic sonar pulses, where the fit processing includes adjusting the data points sampled to align with the pre-existing three dimensional model of the underwater structure. It will be appreciated that in appropriate circumstances, the multiple samples of data points or data points from multiple acoustic sonar pulses that go through the loop 144a can often have overlapping data points, where such overlap can further help increase the probability of finding the best possible alignment of the data points with the model.

That is, the fit is done using a subsample of the data points. Fit uses these points to estimate the pose of the sensor relative to the model. This estimated transform is applied to all data points. The transformed points are then compared to the pre-existing model to determine how well the data matches.

It will also be appreciated that the number of iterations that is appropriate and the amount of overlap used to carry out the alignment and fit can depend upon a balance of several factors. Some factors can include, but are not limited to for example, the amount of processing power employed, how much time is used to collect data, reliability of the data collected and the pre-existing model available, how the underwater vehicle is moving, and the complexity of the underwater structure. Where more than one 3D sonar ping is employed, other factors such as for example, the ping rate of the 3D sonar, the potential increase in the initial pose 130 error over time, and the accuracy of the model can be considered in determining how many iterations of the alignment process are needed.

After many random samples of data points have been fitted, a number of solutions can be obtained. FIG. 2 shows portions Order Solutions by Error 146 and Find Best Solution 148. The solutions provided by the loop 144a are ordered (e.g. at 146) so that the best solution can be obtained (e.g. at 148). Once the best solution is obtained, the closest points on the pre-existing 3D model to each of the inliers of this solution are determined, and the correction to the initial pose that best aligns these inliers with the closest points is computed at Fit w/Inliers 150. The updated pose is sent, for example, back to the underwater vehicle's inertial navigation system.

Change Detection

Figure 5:
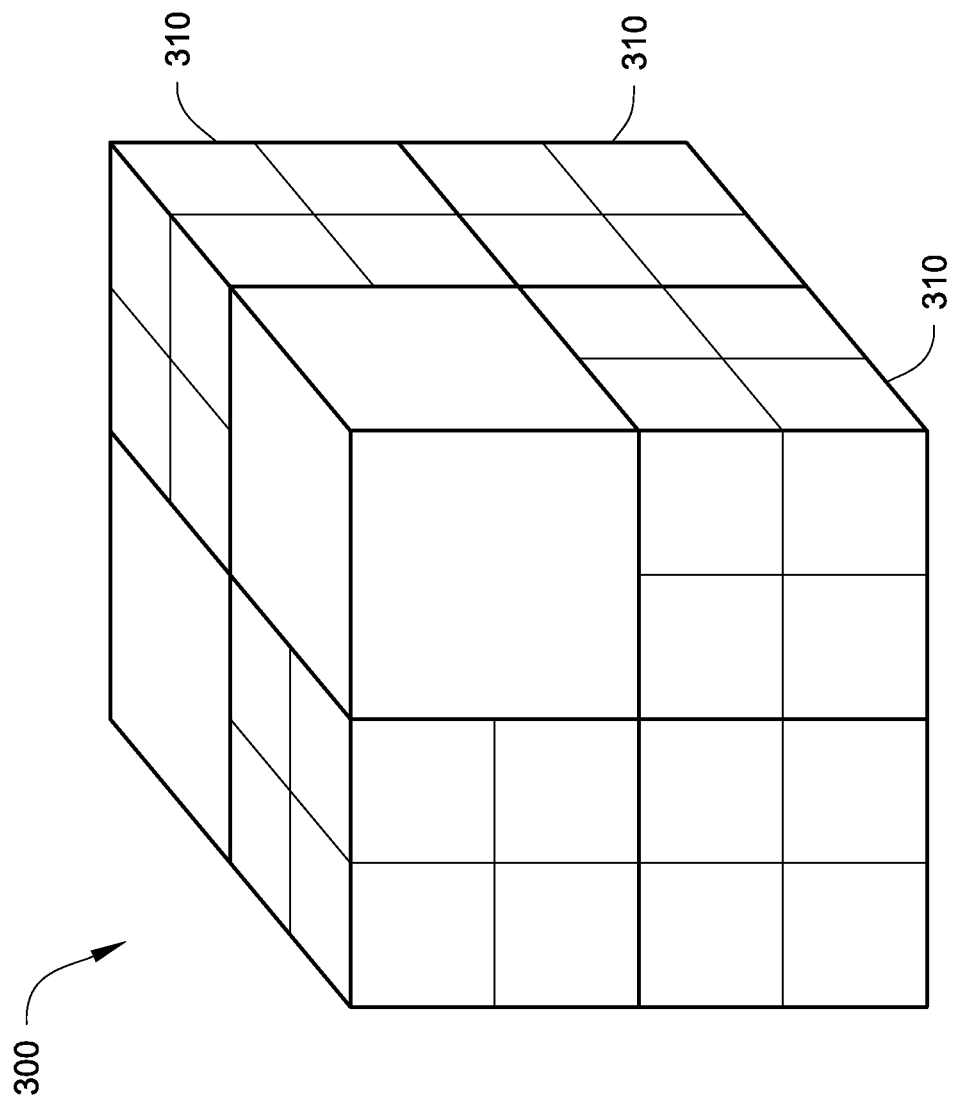
FIG. 5 is one embodiment of a schematic spatial representation of cells for a change detection model, of which a comparison is made against new sonar data received, where such a comparison indicates whether a structural change to an underwater structure has occurred.
Figure 6:
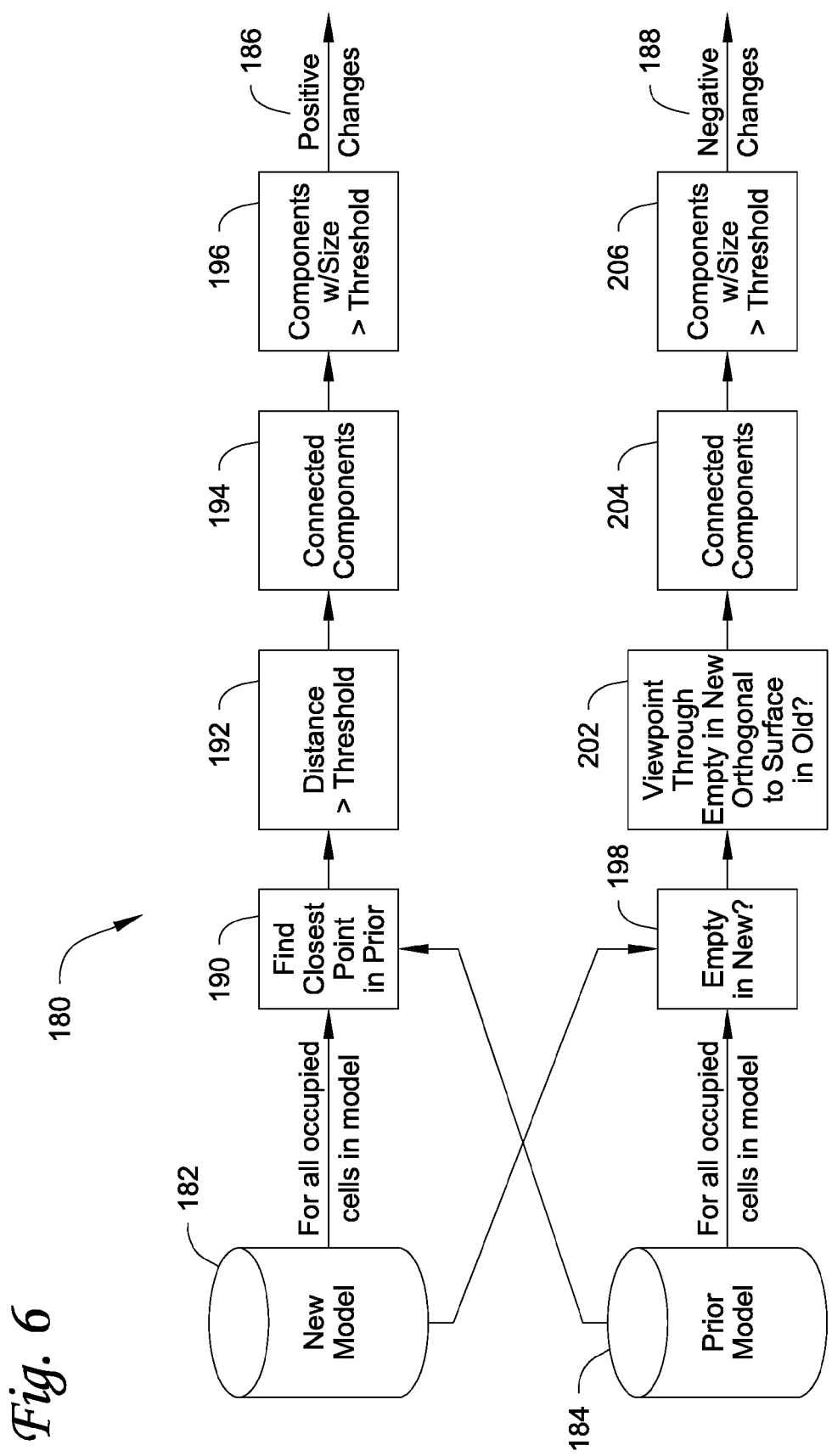
FIG. 6 is a flow diagram of one embodiment for detecting structural change of an underwater structure, which may employ the spatial representation of cells in FIG. 5.

With reference to FIGS. 5 and 6, the results from the alignment processes above are further processed to determine whether structural changes have occurred in the underwater structure (e.g. change detection).

The information obtained during alignment is used to generate a change detection model which is used to compare to the pre-existing three dimensional model of the underwater structure. Based on the comparison, structural changes in the underwater structure can be detected.

FIG. 5 shows a schematic spatial representation of cells 300 for a change detection model. Comparisons can be made to the model against new sonar data received, where such a comparison(s) indicate whether a structural change to an underwater structure has occurred. The spatial representation of cells 300 is shown, where each cell 310 is decomposed with several child nodes 310. FIG. 5 is an exemplary illustration of how an octree may be used to represent a cubic volume of space. The 'model' is actually data that is stored in each of the cells of the octree. As shown, some of the cells are decomposed into eight nodes. It will be appreciated that not every cell may not be decomposed or subdivided, which in appropriate circumstances can allow for a more compact model. Cells are only subdivided in regions of the model that require the smaller, child cells to improve the fidelity of the model.

As described, the spatial representation of FIG. 5 is known as an octree. An octree is a tree data structure in which each internal cell or node has exactly zero or eight children. Octrees can be useful to partition a three dimensional space by recursively subdividing it into eight octants. It will be appreciated that other spatial representations may be possible and that while octrees are known to be suitable for this process, there is no limitation that an octree must be employed.

With further reference to FIG. 5, as the change detection model is generated, each cell contains information about sonar hits or occupied space, sonar pass-throughs or empty space, as well as areas of that are unknown. Each cell may contain the second order moment of the sonar hits, the sonar pass-throughs, or the second moments of sonar pass-throughs. It will be appreciated that octrees, the aggregation of data in octrees, and second order moments are standard concepts that one of skill in the art would understand. For example, when a sonar hit is recorded in a cell, that information is added to the second order moments model in that particular cell. Likewise, when a sonar beam passes through a cell, that information is recorded in sonar pass-throughs and the viewpoint diversity model in that cell. Such information is used together to determine whether the node should be considered empty, occupied, or unknown (e.g. not enough information).

The use of the octree in FIG. 5 allows for generation of the change detection model by collecting information about occupied space where structure is present, collecting information about unoccupied space where structure is not present, and identifying unknown space where there is not sufficient information to determine whether the structure is or is not present. In appropriate circumstances, the change detection model is based on the input of multiple aligned samples. Each aligned sample represents a different viewpoint of an area inspected, such that as more viewpoints are inspected, the confidence that structure exists (or does not exist) becomes higher. This higher confidence represents a higher probability that the change detection model has been created with accuracy. As used herein, the term viewpoint diversity includes but is not limited to refer to the range of orientations of the sonar beams passing through the cell.

It will also be appreciated that, in addition to obtaining information on several viewpoints, the number of times each empty cell and occupied cell is sensed by the sonar sensor may also be tracked and counted, which can further increase the confidence of the model generated.

After building the new change detection model, FIG. 6 illustrates a flow diagram that shows one embodiment for detecting structural change 180 of an underwater structure, for example, using the change detection model of FIG. 5. As shown, both positive changes 186 and negative changes 188 can be determined from using both a new change detection model 182 (new model) generated for the underwater structure and the pre-existing model 184 (prior model) of the underwater structure. As used herein, positive changes are newly detected structure that was not present in the prior model. As used herein, negative changes are missing structure in the new model that was present in the previous model.

In the embodiment shown, positive changes are determined by both inputs of the new model 182 and the prior model 184. Data from occupied cells in the new model 182 are input for further processing along with the prior model 184. Further processing occurs for comparing the occupied cells from the new model 182 and the prior model 184. The closest point is found for the occupied cells of the new model 182 relative to the prior model. Occupied cells whose distance to the closest point in the prior model is greater than a threshold are removed 192, and connected components in the remaining occupied cells are computed 194. The occupied cells contained in connected components of size above a threshold 196 are output as positive change(s) 186.

In the embodiment shown, negative changes 188 are determined by both inputs of the new model 182 and the prior model 184. Occupied cells in the prior model 184 are input for further processing with the new model 182. Further processing occurs for comparing the data from the new model 182 and the prior model 184. Occupied cells of the prior model 184 that are not empty in the new model 182 are removed 198. As shown, remaining occupied cells are removed if in the viewpoint directions in the empty cell in the new model are orthogonal to the model surface in the prior model 202. Connected components of the remaining occupied cells are computed 204 and cells in connected components larger than a threshold 206 are output as negative change(s) 188.

As shown by FIG. 6, the method for change detection 180 reliably finds both positive and negative changes by recording what was sensed and what was not sensed in both the prior model and the new model. For example, it distinguishes between a surface in the new model that was not seen in the prior model and a surface in the new model that was not there in the prior model (e.g. positive changes). Also, the method herein can distinguish between a model surface missing in the new model because it was not sensed in the prior model and model surface missing in the new model because it is no longer present (e.g. negative changes). Further, by recording the number of times a cell 310 is sensed as empty and the diversity of viewpoints from which it is sensed as empty, the method reduces the impact of sonar noise and artifacts.

It will be appreciated that the methods of detecting structural change in an underwater structure herein are provided in an autonomous system onboard an underwater vehicle. In some embodiments, the underwater vehicle is an autonomous underwater vehicle with the appropriate processing capability to detect such changes in real time. However, it will be appreciated that the system may onboard other vehicles.

In one embodiment, the system includes a 3D sonar sensor and an inertial navigation system, along with suitable processing capability to carry out detection of structural changes of underwater structures.

Figure 4:
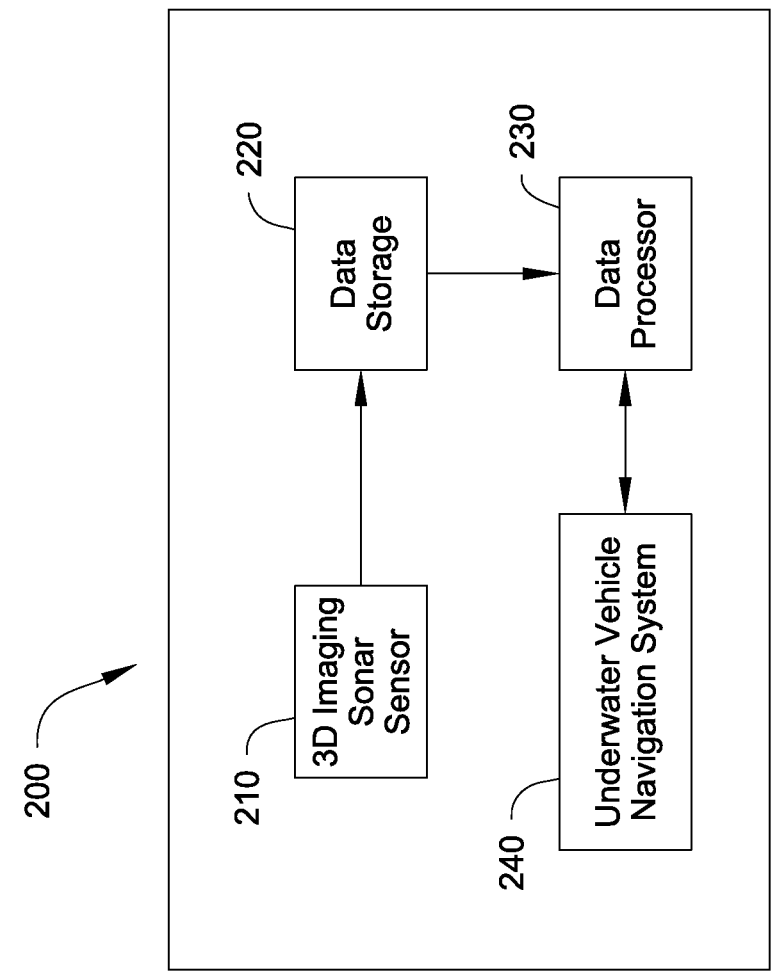
FIG. 4 shows a schematic of a system for detecting structural changes to underwater structures.

FIG. 4 shows a schematic of one embodiment of a system 200 for detecting structure changes in underwater structures. In appropriate circumstances, the system 200 is onboard and part of an underwater vehicle and has real time processing power, for example about one second and sometimes less.

In the embodiment shown, a 3D imaging sonar sensor 210 can transmit a response from a 3D sonar ping to a data storage 220. The sensor 210 is configured to direct an acoustic sonar wave toward an underwater structure, and to process the acoustic sonar wave reflected from the underwater structure into a three dimensional image of the underwater structure. The data storage 220 is configured to receive a response from the sensor.

A data processor 230 is configured to obtain data points from the data storage 220. The data processor 230 can be, for example, any suitable processing unit. The data points are configured to provide a three-dimensional image of the underwater structure. The processor 230 is configured to align a sample of the data points obtained to the pre-existing three dimensional model of the underwater structure. The processor can generate a change detection model based on the aligned sample, and compare it to the pre-existing three dimensional model of the underwater structure. Based on the comparison, the processor is configured to detect whether a structural change in the underwater structure has occurred.

It will be appreciated that the information obtained on the underwater structure can be used to update the vehicle navigation system 240 which is, for example, an inertial navigation system. It will be appreciated that the components of the system 200 can be powered by the underwater vehicle.

The methods and systems described herein above can be used to detect structural changes to underwater structures based on features of the underwater structure from the 3D sonar scans. Such applications can include but are not limited to subsea structure inspection both commercial and military, harbor inspection, and mine detection/countermeasures. In one embodiment, data from 3D sonar scans is collected, data from inertial navigation is collected, and the data is logged and processed to compare the 3D image of the scanned underwater structure with a pre-existing three dimensional model of the underwater structure. The collection, logging and processing of the data can be performed using the data processing electronics onboard the underwater vehicle, with real time processing capability.

Detection of structural changes can be useful when inspecting for damage or deformation of underwater structures. The methods and systems described herein above can be useful, for example, in situations where an underwater vehicle is far from the seafloor, for example over 1000 meters, such that other navigation tools, such as DVL are unavailable. It will be appreciated that no other feature based sensors are necessary and that navigation relative to non-stationary underwater structures may also be possible using the methods and systems herein. The use of 3D sonar allows scanning of complex 3D structures to provide a full six degrees of freedom in pose.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of detecting structural changes to underwater structures comprising:
    directing from a sensor an acoustic sonar wave toward an underwater structure;
    receiving by the sensor the acoustic sonar wave reflected from the underwater structure, the acoustic sonar wave having one or more acoustic sonar pulses,
    obtaining 3D data points from the one or more acoustic sonar pulses of the acoustic sonar wave reflected from the underwater structure, the 3D data points are configured to provide a three-dimensional image of the underwater structure;
    aligning a sample of the 3D data points obtained from the one or more acoustic sonar pulses of the acoustic sonar wave to a pre-existing three dimensional model of the underwater structure, the aligning comprises estimating a position and orientation of the sensor relative to the pre-existing three-dimensional model of the underwater structure, using an iterative processing loop based on inliers of the 3D data points;
    generating a change detection model based on the aligned sample;
    comparing the change detection model to the pre-existing three dimensional model of the underwater structure; and
    based on the comparison, detecting whether a structural change in the underwater structure has occurred.

2. The method of claim 1, wherein the underwater structure is non-stationary.

3. The method of claim 1, wherein the steps of directing, receiving, obtaining, aligning generating, comparing, and detecting are performed onboard an autonomous underwater vehicle.

4. The method of claim 1, wherein the step of obtaining the 3D data points comprises filtering the 3D data points.

5. The method of claim 1, wherein the step of aligning comprises repeatedly aligning the 3D data points from a single acoustic sonar pulse to the pre-existing three dimensional model of the underwater structure.

6. The method of claim 1, wherein the step of aligning comprises repeatedly performing a fit processing on 3D data points obtained from multiple acoustic sonar pulses that have overlapping 3D data points.

7. The method of claim 1, wherein the pre-existing three dimensional model is present at the time of initiating a detection of structural change.

8. The method of claim 1, wherein the pre-existing three dimensional model is updated after completing an iteration of directing, receiving, obtaining, comparing, and determining.

9. The method of claim 1, wherein the step of generating a change detection model based on the aligned sample comprises collecting information about occupied space where structure is present, collecting information about unoccupied space where structure is not present, and identifying unknown space where information has not been collected.

10. The method of claim 1, wherein the step of generating a change detection model based on the aligned sample comprises inputting multiple aligned samples, each aligned sample represents a different viewpoint of an area inspected.

11. The method of claim 1, wherein the aligning comprises repeated alignment and fit processing using a random sample consensus processing loop.

12. A system for detecting change in underwater structures comprising:
    a sensor onboard an underwater vehicle, the sensor is configured to direct an acoustic sonar wave toward an underwater structure, where the acoustic sonar wave is reflected from the underwater structure, the acoustic sonar wave having one or more acoustic sonar pulses, and configured to receive the reflected acoustic sonar wave;
    a data storage onboard the underwater vehicle that is configured to receive a response from the sensor; and
    a data processor onboard the underwater vehicle,
    the data processor is configured to obtain 3D data points from the data storage, the 3D data points are configured to provide a three-dimensional image of the underwater structure,
    the processor is configured to align a sample of the 3D data points obtained from the one or more acoustic sonar pulses of the acoustic sonar wave to a pre-existing three dimensional model of the underwater structure, where the processor is configured to estimate a position and orientation of the sensor relative to the pre-existing three-dimensional model of the underwater structure using iterations based on inliers from the 3D data points,
    the processor is configured to generate a change detection model based on tth aligned sample, and
    the processor is configured to compare the change detection model to the pre-existing three dimensional model of the underwater structure; and
    based on the comparison, the processor is configured to detect whether a structural change in the underwater structure has occurred.

13. The system of claim 12, wherein the processor is configured to repeatedly perform alignment and fit processing using a random sample consensus processing loop.

* * * * *